US007717353B2

(12) United States Patent
Matulis

(10) Patent No.: US 7,717,353 B2
(45) Date of Patent: May 18, 2010

(54) METHOD AND DEVICES FOR DISPENSING FLUIDS

(75) Inventor: Joseph J. Matulis, 259 Palm Park Cir., Suite 201, Longwood, FL (US) 32779

(73) Assignee: Joseph J. Matulis, Longwood, CA (US)

( * ) Notice: Subject to any disclaimer, the term of this patent is extended or adjusted under 35 U.S.C. 154(b) by 1230 days.

(21) Appl. No.: 11/114,013

(22) Filed: Apr. 26, 2005

(65) Prior Publication Data

US 2005/0242119 A1    Nov. 3, 2005

Related U.S. Application Data

(60) Provisional application No. 60/566,501, filed on Apr. 28, 2004.

(51) Int. Cl.
*B05B 17/00* (2006.01)

(52) U.S. Cl. ............................ 239/1; 239/61; 239/69; 239/172; 239/195; 239/304; 239/413; 239/428; 239/525; 239/575; 239/662; 239/663; 222/135; 222/145.6

(58) Field of Classification Search ................ 239/1, 239/61, 67, 69, 124, 127, 142, 144, 172, 239/175, 195, 303, 304, 305, 307, 308, 310, 239/413, 416.1, 418, 419, 422, 428, 433, 239/525, 526, 588, 662, 663, 575; 222/57, 222/135, 145.6, 145.7; 366/153.1, 160.1, 366/163.1, 136.2
See application file for complete search history.

(56) References Cited

U.S. PATENT DOCUMENTS

| | | | | |
|---|---|---|---|---|
| 3,279,337 A | * | 10/1966 | Weaver | 239/172 |
| 4,140,349 A | * | 2/1979 | Behnken | 239/172 |
| 6,425,529 B1 | * | 7/2002 | Reinsch et al. | 239/310 |
| 6,550,692 B1 | * | 4/2003 | Schacht | 239/172 |

\* cited by examiner

*Primary Examiner*—Steven J Ganey

(57) ABSTRACT

An apparatus for dispensing and mixing flowable materials that includes at least one hopper connected to a mixing chamber. The apparatus further includes at least one valve associated with the hopper. The valve operates to regulate the flow of material from the hopper to the mixing chamber. The apparatus also includes a controller that communicates with the at least one valve wherein the controller selectively controls the operation of the valve.

16 Claims, 5 Drawing Sheets

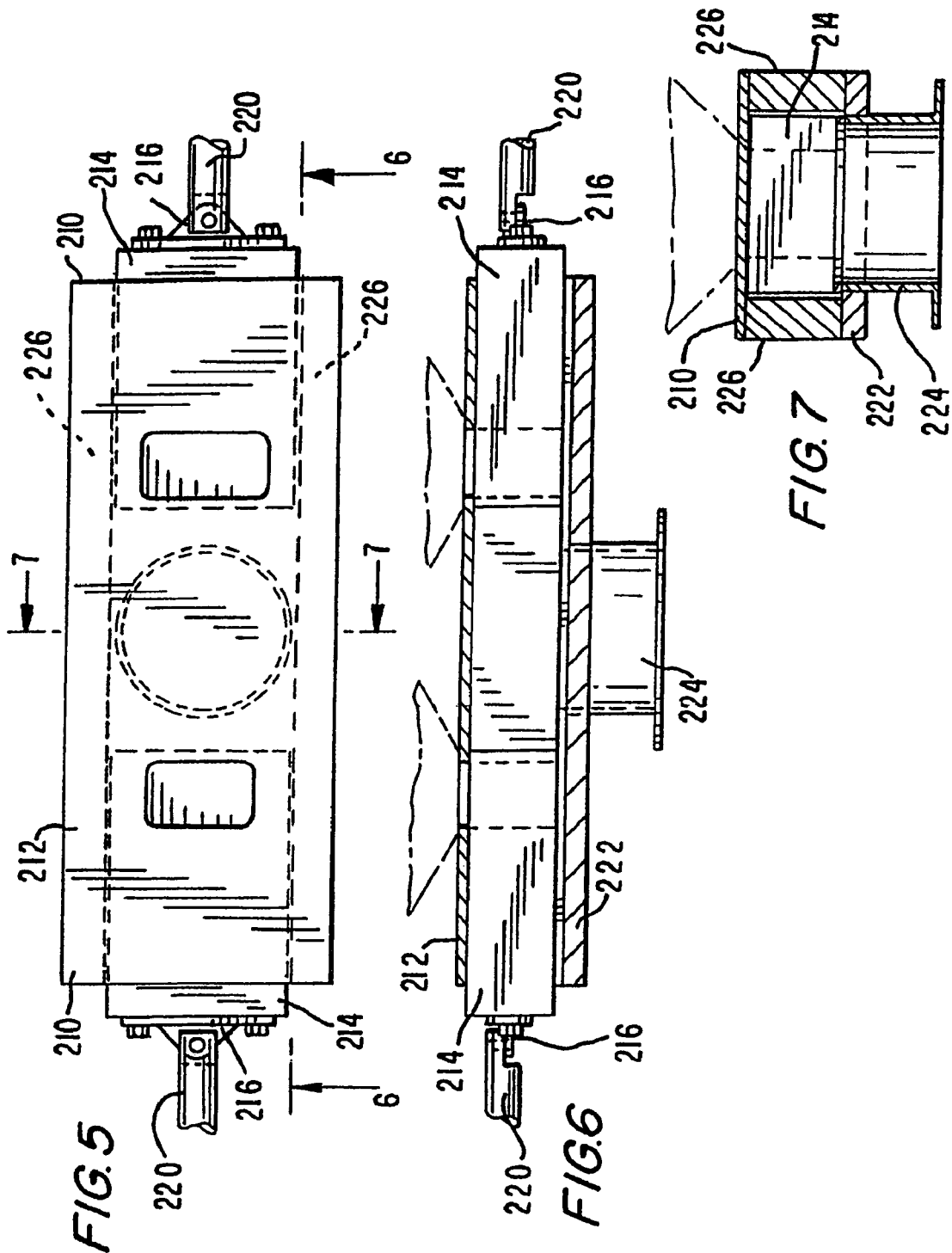

METHOD AND DEVICES FOR DISPENSING FLUIDS

PRIORITY

This application claims priority to provisional U.S. patent application entitled, METHODS AND DEVICES FOR DISPENSING FLUIDS, filed Apr. 28, 2004, having Ser. No. 60/566,501, the disclosure of which is hereby incorporated by reference in its entirety.

FIELD OF THE INVENTION

This invention relates to methods and devices for dispensing fluids, and is especially useful for dispensing fluids used as fertilizers and pesticides to a wide variety of plants in all areas of horticulture. As used in this description, "fluids" include liquids, gases, slurry solutions, dry granular products (such as nutrients), slurries, gels and dispersions or suspensions of powders in an aqueous medium or otherwise flowable materials or materials that are flowable. Those of skill in the art will recognize other fluids.

BACKGROUND OF THE INVENTION

Known fertilization techniques exhibit many disadvantages. One such technique, the dry-spreader method, used primarily for lawns, uses a mechanical-cyclone or drop-spreader apparatus to spread a dry granular fertilizer. At least five kinds of waste are inherent in this method. First, while the amount of active nutrients available to plants from granular fertilizer can vary widely from brand to brand, typically a bag of pre-blended granular fertilizer might contain as much as 98% inert matter such as fillers, carriers, and coatings that merely transport a relatively small amount of active ingredients to the plants. The inert matter has no other benefit for the plants. Second, significant amounts of the active ingredients (typically nutrients) are often lost as a result of atmospheric conditions such as heavy rain or high winds and clipping removal. Third, the dry-spreader method is frequently subject to a considerable amount of un-dissolved or un-converted nutrients that have been locked up in the soil, unable to be absorbed by root system, because of an imbalance in excess of another nutrient. Fourth, since the mechanical broadcast type spreaders equipment typically cannot be better controlled, it frequently wastes a considerable amount of the granular fertilizer being applied, on to surfaces such as walkways, driveways, parking lots and patios, etc., instead of within the sub-surface of the turf and around the base of shrubs and trees beds where it belongs Fifth, attempts to achieve a "quick greening" with a dry-spreader method require excessive watering in order to begin a dissolving process of the fertilizer, so that nutrients can be absorbed into the root system more rapidly, but this over-watering can actually result in the loss of the necessary nutrients desired to produce a quick greening effect, by causing the nutrients to leach well beyond the root system. Additionally, depending upon the soil composition, such as dense clay-based soils, excessive watering may also increase the potential of nitrate (nutrient) run-off, which then also contaminates ground-water supplies, pollutes ponds, streams, and natural waterways. The loss of nitrogen through leaching, run off, and volatilization (evaporation into the atmosphere) is also a growing ecological concern.

Another critical disadvantage to using this dry-spreader applied method is early morning applications, when dew is present on the lawn, is potentially injurious to the plant, because unless the particles are immediately "watered in," the granular inorganic particles that stick to the damp grass blades significantly increase the probability for "fertilizer burn." On a lawn, fertilizer burn typically results in brown spots or leaf shoots turning brown (dehydrated) from the tip down. Another significant problem with the dry-spreader method is that, because the fertilizer is typically put down in rows over a lawn, frequent row-skipping or overlapping results in under or over-fertilizing, causing a blotchy or stripped appearance. When fertilizers are being applied to shrub and tree beds, the application is commonly done by broadcasting hand fulls of the product from a pail over the area. This antiquated and applicator health risk method falls short in being able to apply the products evenly throughout the shrub and tree beds. This method wastes a considerable amount of the product, since the uptake (absorption) of the essential nutrients for the plants overall benefit are locked up on the surface of bed and unable to be homogeneously absorbed by the root system of the plants.

Maintaining a balance of nutrients in the soil is an important management objective. By judicious use of fertilizers, nutrients which are deficient in soil can be supplied to growing plants. The objective of fertilizer programs is to supplement the capacity of soils as precise as possible to supply nutrients that would otherwise be deficient for normal and healthy growth.

Furthermore, to be effective, it is recommended that fertilizers that are applied by the dry-spreader method be "watered in." That is, the particles should be in a dissolving process for the active nutrients to be eventually absorbed by the plants' root system.

It is well known that nitrogen sources that readily dissolve in water pass into solution at a faster rate than the plant, or often the soil itself can absorb them. This is a common occurrence with most powders, liquids, and some granular products that have a sulfur coating on the particles, such as sulfur-coated urea. Heavy rains or daily sprinklings will dissolve the coating of the particle too quickly, releasing too great a quantity at one time of the active nitrogen source, thus increasing a high probability of burn and stress damage to the plant, including the waste or significant reduction of the product's life span.

Another commonly known fertilization technique, the aqueous-dispersion method, uses a spray nozzle to disperse fine powders in an aqueous medium. The aqueous medium containing these fine powders is typically obtained by blending, along with other liquid fertilizers, in a tank of water, which acts as a carrier for the nutrients. The aqueous-dispersion method is typically carried out with conventional spraying equipment or by pressure injection through an irrigation system.

This aqueous-dispersion method allow formulations that provide nitrogen, phosphorous, and potassium nutrients in a liquid flowable form with an analysis usually pre-blended from the manufacturer. In order to keep these materials well blended on the spraying rig, the agitation depends upon a small propeller type fan mounted on the inside of the spraying tank.

These soluble fertilizer forms usually provide nutrients, which are immediately available to the plant, and therefore, enable quick response or "quick greening" of the lawn. But such a liquid or blended-powder solution is often too rich in immediately available nutrients and is particularly high in salt-rated nitrogen. They are mixed sparingly because of their potential for burning, and require careful monitoring of the amount of product being applied, and the number of applications required to maintain a desired appearance. They may improve some (short-lived) plant characteristics, such as shoot growth and color, but do not promote or stimulate the desired balanced root development for the overall health of the plant. Applying these rich nutrients would be an occasional "nice treat" for the plants, but not a good diet to maintain the overall health and root development, which is the foundation and life support of the plant.

Furthermore, all fertilizers contain salt. These salts are not unlike table salt except that they contain various nutrients. When a salt is added to water, the osmotic pressure of the solution is increased. Osmotic pressure, in a sense, is a measure of the force that a dissolved substance exerts on a semipermeable membrane, such as turf grass. When a fertilizer, either as a liquid or a powder, is applied to the surface of the soil, the fertilizer salts must sooner or later enter and become a part of the soil solution before the nutrients can enter the roots and be used by the plant.

The increase in the osmotic pressure may determine whether the plant will survive or die from a fertilizer burn. Water can pass through the root cell membranes of the plant only when the osmotic pressure of the soil solution is lower than that of the solution inside the cell. If the osmotic pressure of the soil solution becomes greater than that of the solution inside the plant cell, water cannot enter the cell and may even be drawn or pulled out of it. A higher pressure pulls a lower pressure. When water and the nutrients of the soil solution cannot enter the root cell membranes of the plant, eventually this will results in the death of the cells. When the root cells die, the whole plant may die. Normally water moves from soil into a plant root, but water can move out of a root if too much fertilizer makes the concentration of salts in the soil too high. In fertilizer burn, water is drawn out of the plant as a result of osmotic pressure from the root to the soil, thereby dehydrating and killing the plant.

Liquid or powdered fertilizer solutions are characterized as being too rich in immediate available nutrients and are particularly high in salt rated nitrogen. A solution, which is too high in salt, will cause the death of the cells, which is typical of the "burning" appearance of the lawn or plant leaf caused by this high salt solution.

Some of the disadvantages associated with known fertilization methods are addressed by the slurry spray technique described in U.S. Pat. No. 4,238,072. This process consists of mixing into a large tank of water separate, raw, required plant nutrients as one large batch of nitrogen, phosphorous, potassium and other micronutrients in a dry granular form. Through agitation the granular particles are maintained in suspension within the tank, attaining a uniform distribution of the combination of soluble nutrients and insoluble nutrients. The mixture is then applied to the plants as a slurry spray. When the mixture soaks into the ground it carries with it a combination of soluble and insoluble nutrients for immediate nourishment to the plant as compared to the other methods. The majority of the insoluble granular nutrients that stay intact penetrate the sub-surface, remain there, releasing their nutrients slowly over a longer period of time.

But there are still disadvantages with this slurry spray method. Typically a lawn-care service, using the slurry spray technique as described above, will mix one large batch of fertilizer at the beginning of the day. Because of the apparatus design, as the fertilizer mixture continuously flows through its recycling pump and is returned back to the mixing tank, in addition with the mixture being exposed to continuous rising heat of the ambient temperature, the granular insoluble based products break down. This gradually accelerates the granules' soluble potency, which increases the probability of fertilizer burn, and also decreases the particle size, rapidly decreasing the granules' insoluble residual life. One can try to address this problem by adding more granule-based insoluble product at mid-day, but this will cause an imbalance in the percentage of basic essential nutrients of nitrate, potassium and phosphorous of the original batch, and further contribute to the reduced uptake of other essential nutrients. Nutrient balance is extremely important in plant nutrition. An excess of one nutrient can cause reduced uptake of another. An excess of potassium, for example may compete with magnesium uptake by plants. A heavy application of phosphorous may induce a zinc deficiency in soil that is marginal or low in zinc. Excess iron may induce a manganese deficiency.

In addition, different lawns and their conditions may require different amounts of care, and thus different fertilizer formulations. But with known methods and devices, including the slurry spray method, it is difficult to customize formulations for each job site that a lawn-care service may address on a given day. Again, the typical practice is to mix one large batch of a single fertilizer formulation at the beginning of the day and apply the same formulation regardless of the different nutrients that are required for each lawn or plant.

It would be advantageous to have methods and devices that address the disadvantages inherent in the slurry spray method along with the disadvantages associated with other methods of dry-applied mechanical spreader and liquid/powder, aqueous spray applied techniques as outlined above.

SUMMARY OF THE INVENTION

The present invention does so by providing methods and devices that make possible and improve a Select/Slurry Solution spray technique of custom blending nutrients that are required and desired for a wide variety of on-site horticulture conditions, from the highly delicate leaf shoots of turf grass to the hardy and vigorous growing conditions of shrubs and trees. The invention provides a new and improved and more precise application method for both quick and slow release fertilization to plants.

In one embodiment, the invention comprises mixing into a 5-8 gallon capacity mixing chamber, separate required plant nutrients of nitrogen, phosphorous, potassium and other micronutrients in a dry granular form, all within a mesh screen size of #6-#100. These dry granular elements are stored in their own separate on board sealed hoppers, located above the water filled mixing chamber. Most of the products used are pure processed nutrients without carriers such as clay or sand, fillers or non-beneficial coating's (as is typical of pre-blended bagged fertilizers) and are of the variety that are extremely low in soluble salts, uniform in size, slow "controlled released" and are 100% available to the plant and very visible when sprayed in a Select/Slurry Solution.

Through pressurized agitation, the on-board, computer generated Select/Slurry Solution maintains the elements in suspension within the mixing chamber, attaining a uniform distribution of the soluble nutrients and insoluble granular particles. The mixture is then applied to the plants as a Select/Slurry Solution. When the mixture soaks into the ground, when applied to turf grass, for example, it permeates through the pores of the leaf shoot and carries with it an extremely precise, safe, and low in soluble salt percentage of nutrients for immediate nourishment to the plant. Immediately, there then occurs a gradual absorption of the solution through the protein of the cell membrane that functions as a channel for specific substances to enter or leave the cell without injury, creating a safe non-burning condition for the "quick greening" affect to occur. Furthermore, and more importantly, the majority of the insoluble granular nutrients that stay intact penetrate to the sub-surface, aided by the flushing affect of the aqueous Select/Slurry Solution, remaining there, to release their nutrients slowly and safely over a long period of time, directly through the root system.

In addition to the primary advantages of this computerized Select/Slurry Solution technique for applying precision controlled, low in salt nutrients to the plants, the need for even further improvements became apparent. The first of these is that each lawn to be treated in a single day does not necessarily require the same formulation of nutrients. Some landscapes are healthy and require only basic nutrients and supplements, while others are weak and undernourished and require more care.

Those skilled in the art of fertilization will recognize that the generally accepted number of essential nutrients required in plant growth is 16. These are carbon hydrogen, oxygen, nitrogen, phosphorus, potassium, calcium, magnesium, sulfur, boron, chlorine, copper, iron, manganese, molybdenum and zinc. Many more elements are found in plants, but their essentiality has not been established. Three of the 16 essential elements, carbon, hydrogen and oxygen are taken primarily from the air and water. The other 13 are normally absorbed from soil by plant roots. These 13 elements are divided into three groups: primary nutrients, secondary nutrients and micronutrients. This grouping separates the elements on the basis of relative amounts required for plant growth. Nitrogen, phosphorous and potassium are the three primaries. Nitrogen promotes blade greening and shoot growth, phosphorous promotes root development and potassium promotes the all-around health, hardiness and strength of the plant. All of these elements are equally essential regardless of amounts required and must be applied with much care and consideration for not only the plants overall health, but more importantly, for the careful consideration to the environment.

The idea of providing a custom blended formula of primary, secondary, and micronutrients tailored to each customer on a single route, led to the creation of a concept for the final production design of the Select/Slurry Solution invention. This invention includes a precise, computer-generated, selected formula or recipe for all plants on each application site. With other current, antiquated methods of application (liquid spray or dry spreader or slurry spray) every customer on the day's route usually receives the same variety of nutrients, more or less in quantity, regardless of the diverse species and the overall health and condition of the plants present on each property. Those of skill in the art recognize that the formulation of nutrients, and their weights, must not only be altered as the season progresses, but also altered with the diversity of plant conditions from property to property, which ordinarily presents a dilemma in caring for the existing customer base, but becomes more difficult when new customers are added daily who are scheduled on the same route.

The new customer's lawn, shrubs, trees, flower beds, vegetable or flower garden etc., may not have been fertilized for months or years. The plants may be deficient in one or several primary or secondary essential nutrients that are not included in that day's liquid/powder or slurry spray formulations in the tank or with the dry spreader applied method, not pre-blended in the bags of granular fertilizer stored on the truck. With the Select/Slurry Solution invention technique, the existing customers on the route, including any newly acquired scheduled accounts, are conveniently and efficiently accommodated on the same route, on the same day, with their own computerized Select/Slurry Solution of custom-blended required products. There's no need to have separately scheduled applications on the same site to treat the variety of different plants. Turf grass, shrubs, trees, flower and vegetable gardens can be treated on the same visit, custom-blending solutions of essential nutrients for each group of plant species on the site.

Over 90 computer-based formulations can be selected covering a broad spectrum of required nutrient combinations for turf grass and to shrubs and trees on the same site. The invention will blend and deliver a computerized or manually Selected/Slurry Solution for the plants on site with precision, for the amount of each actual nutrient required for that type of plant species. Each nutrient can be precisely measured by the ounce and continually monitored, tracked, and recorded by the on-board computer system for the total poundage used on each site. The most commonly used nutrient of nitrogen can be applied from ¼ lb. to 2 lbs. per 1,000 sq. ft. of turf grass area or shrub bed area.

One of the invention's most unique features is the ability to mix a variety of products, conceivably as many as seven different nutrients simultaneously, on a continuous basis, decreasing or increasing their individual or combined potency for that time of the season, but more importantly, for the overall health of the plant. This is especially advantageous when weather conditions have been generally favorable for plant's health and growth in any given season. The owner/operator can easily decrease material costs by uniformly reducing the quantities of products required. This permits significant savings during favorable seasonal conditions without jeopardizing the overall health of the plants. Furthermore, because of the precise amount of nutrients applied, plants are not over-fertilized as is typically associated with the other hit or miss application techniques. Thus, further reducing the environmental and ecological impact. This is especially characteristic of bagged (bulk-blends) of fertilizer used in the dry spreader applied method.

Bulk blends are physical mixes of two or more fertilizer materials. The bulk blend plant receives fertilizer products from a basic producer, stores them and blends them together as needed in some type of mixing device. Some of the materials more commonly used to make blends are: ammonium nitrate, ammonium sulfate, diammonium phosphate, and urea and potash materials. The blends may be taken directly to the field and spread, or, in most cases, they are bagged. One of the persistent problems with pre-blended fertilizers is segregation or separation of one component or raw material from another within the bag. Frequently this means separation of the nitrogen from the phosphate or potash. Consequently, when a pre-blended dry fertilizer is applied with a mechanical spreader, uneven distribution of nutrients may increase this occurrence. This further increases the likelihood of causing a stripped or blotchy appearance that is directly associated with typical fertilizer burn from the dry spreader applied method. Furthermore, an excess of one nutrient can cause reduced uptake of another are previously explained and described.

The principle, contributing factor to segregation is the use of materials of different sizes. For example, if fine crystalline ammonium sulfate is blended with granular diammonium phosphate, segregation occurs due to the difference in the size of the two materials. Most fertilizers are screened through a −6+16 Tyler screen. If one component such as diammonium phosphate is predominately −6+8 and the other, ammonium sulfate, is predominately −12+16, segregation occurs even though both lie within the −6+16 range. Maintaining a balance of nutrients in the soil is an important management objective as previously and described.

In this invention, this problem of segregation is completely eliminated since all products are introduced into the water-filled mixing chamber by means of a computerized selection by their precise weight and evenly suspended in the aqueous solution just before applying them to the plants. Furthermore, since the invention has an extremely small capacity mixing chamber, the insoluble granular particles that remain in suspension within the mixed solution are not likely to prematurely break down or reduce in size, because of the heat of the day, accelerating the granules soluble potency, thus increasing the higher probability of fertilizer burn, for example.

The computerized select/slurry solution is precise in mixing the amount required for applying the correct and desired poundage of materials per 1,000 sq. ft. of turf grass or shrub bed area.

The on-board computer system automatically monitors the actual application, tracking the precise quantity of each selected nutrient, considerably reducing typical over fertilization waste and potential damage of plant injury. In addition, all the products are applied by the accuracy of a selectable WhirlJet slurry cone spray nozzle applying the products exactly where they are required for the plants. Sidewalks, driveways, and parking lots are not stained with wasted products that typically cannot be controlled with the mechanical spreader method. This automatic monitoring of the precise quantity used and applied, including the amount of square footage treated per site, also minimizes the concerns of any products being applied on other sites that are not on the applicators scheduled route for that day.

Another one of the invention's most unique advantages is its ability to precisely formulate and place the required and desired nutrients for all shrub and trees, regardless of their species or mass planting arrangement. A rigid telescoping application wand with the accuracy of an attached selectable WhirlJet slurry cone spray nozzle with 400' of hosing enables the applicator to easily access both foliage and plants, directing the Select Slurry Solution of soluble and insoluble products directly to the base of the plants within the shrub or tree bed.

This notable advantage of the invention is two fold. First, immediate and precise computer controlled formulating of the required nutrients for the particular species, mainly formulating much greater poundage's of the primary nutrients per 1,000 sq. ft. of bed area, as compared to the lesser amounts required for turf grass square footages. Second, ease of accessibility, velocity and accuracy of product placement, and the considerable reduction of overall health risks to the applicator applying these products by typical and frequently used hand placement.

Additionally, further advantages of the Select/Slurry Solution invention will be to aid considerably in improved plant response and overall health from the precision of mixed products, while maintaining, if not improving, the overall appearance of the plants.

The Select/slurry Solution invention will help in reducing the number of applications and the quantities of products required without depreciating the maximum results desired. This not only in turn reduces the supplier's cost of caring and feeding for the plants; it also reduces the environmental impact.

If and when required, either on a problem lawn or as a preventative measure to control weeds, undesirable grasses, insects, and fungus disease, herbicides, insecticides and fungicides can also be custom blended within a separate on board non-electric chemical injector delivery system, thus minimizing the risks of any additional unnecessary environmental damage or pollution. This enables the applicator to treat all the plants on the site on the same visit, with a wide variety of formulations safely, efficiently, and effectively utilizing the invention disclosed herein.

In one embodiment of the invention, a machine for dispensing flowable materials includes two or more hoppers mechanically connected to a mixing chamber; one or more valves associated with the hoppers that regulate the flow of material from each of the hoppers to the mixing chamber; and a controller electrically connected to the one or more valves that selectively controls the operation of the one or more valves.

In another embodiment of the invention, a machine for dispensing flowable materials includes two or more hoppers mechanically connected to a mixing chamber; one or more valves associated with the hoppers that regulate the flow of material from each of the hoppers to the mixing chamber; one or more hydraulic actuators, hydraulically connected to a manifold, associated with the one or more valves; a hydraulic input hydraulically connected to the manifold; a reservoir return hydraulically connected to the manifold; a sprayer pump hydraulically connected to the manifold and fluidically connected between the mixing chamber and a spray hose; a water pump hydraulically connected to the manifold and fluidically connected to the mixing chamber; and a controller electrically connected to the one or more hydraulic actuators that selectively controls the operation of the one or more valves.

In a further embodiment of the invention, a method for dispensing flowable materials includes the steps of providing granular material in a plurality of hoppers mechanically connected to a mixing chamber; regulating the flow of material from each of the hoppers to the mixing chamber with one or more valves associated with the hoppers; and electrically controlling the one or more valves to selectively operate the one or more valves.

In yet another embodiment of the invention, a method for dispensing flowable materials includes the steps of providing granular material in a plurality of hoppers mechanically connected to a mixing chamber; regulating the flow of material from each of the hoppers to the mixing chamber with one or more valves associated with the hoppers; actuating one or more hydraulic actuators, hydraulically connected to a manifold, associated with the one or more valves; providing a hydraulic input hydraulically connected to the manifold; providing a reservoir return hydraulically connected to the manifold; providing a sprayer pump hydraulically connected to the manifold and fluidically connected between the mixing chamber and a spray hose; providing a water pump hydraulically connected to the manifold and fluidically connected to the mixing chamber; and electrically controlling the one or more hydraulic actuators to selectively operate the one or more valves.

In accordance with another embodiment of the present invention, an apparatus for mixing and dispensing flowable materials is provided, comprising: a mixing chamber; a first hopper that retains a first flowable material, connected to said mixing chamber; a first valve associated with said first hopper, wherein said first valve regulates the flow of the first flowable material from said first hopper to said mixing chamber; a water pump unit; a control that selectively controls said first valve and selectively controls said water pump unit.

In accordance with still another embodiment of the present invention, a method for formulating a nutrient mixture for a designated property of parcel of land is provided, comprising: inputting identifying and/or quantitative information for the property into a controller; providing a first flowable material in a first hopper, wherein the first hopper is connected to a mixing chamber; controlling the flow of the first flowable material from the first hopper to the mixing chamber via the controller, wherein the controller regulates the flow of first flowable material in accordance with the identifying and/or quantitative information; and pumping an amount of water in accordance with the identifying and/or quantitative information into the mixing chamber.

In accordance with another embodiment of the present invention, an apparatus for mixing and dispensing flowable materials is provided, comprising: a mixing chamber; a hydraulic assembly comprising a hydraulic manifold and an actuator; a hopper assembly comprising: at least one hopper connected to said mixing chamber, wherein said hopper retains a flowable material; and a valve associated with said first hopper, wherein said valve regulates the flow of the first flowable material from said first hopper to said mixing chamber; and a pump assembly connected to said hydraulic assembly, said pump assembly comprising a water pump connected to said hydraulic manifold; and a controller that selectively controls said mixing chamber, said hydraulic assembly and said pump assembly.

BRIEF DESCRIPTION OF THE DRAWINGS

FIG. 5 is a top plan view of the double slide-gate valve assembly shown in FIG. 4.

FIG. 6 is a vertical sectional view of the double slide-gate valve assembly shown in FIG. 5, taken on line 6-6 in FIG. 5.

FIG. 7 is a vertical sectional view of the double slide-gate valve assembly shown in FIG. 5, taken on line 7-7 in FIG. 5.

DETAILED DESCRIPTION

Figure 1:
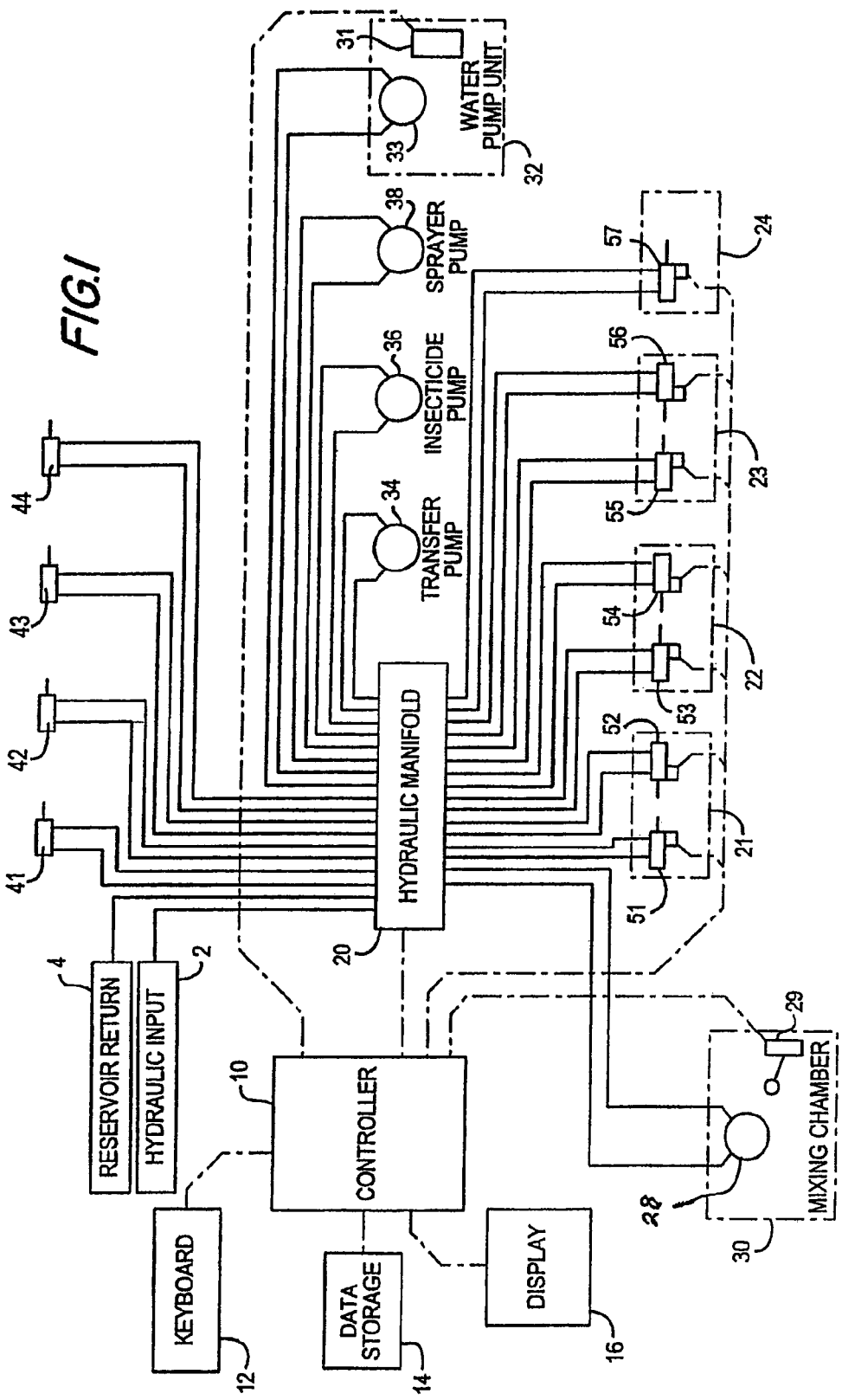
FIG. 1 is a schematic diagram of a system for dispensing flowable materials in accordance with an embodiment of the present invention.

FIG. 1 shows one preferred embodiment, a system for dispensing flowable materials according to the present invention As shown in FIG. 1—where dashed lead lines show electrical connections and solid lead lines show hydraulic connections—the system includes controller 10 and associated keyboard 12, data-storage device 14 (such as a PCMCIA card, hard-disk drive, or CD-ROM drive), and display 16 (such as an LCD-based flat panel, CRT, or plasma display).

Controller 10 is electrically connected to, and can electronically control, hydraulic manifold 20, hydraulic actuators 51-57, float switch 29 in mixing chamber 30, and flow meter 31 in water pump unit 32.

Hydraulic manifold 20 is hydraulically connected to mixing chamber pump 28, water pump 33, transfer pump 34, insecticide pump 36, sprayer pump 38, clump busters 41-44, and slide-gate valves 61-67. Hydraulic manifold 20 is also hydraulically connected to hydraulic input pump 2 and hydraulic reservoir 4. Hydraulic fluid constantly cycles through the system; beginning with hydraulic input pump 2, which pumps hydraulic fluid from hydraulic reservoir 4, hydraulic fluid is introduced into the system, eventually returning to hydraulic reservoir 4.

Slide-gate valves 21-24 regulate the introduction of dry granular product from seven hoppers to mixing chamber 30. Slide-gate valves 21, 22, and 23 each regulate two hoppers; slide-gate valve 24 regulates one hopper. Hydraulic actuators 51-57 actuate slide-gate valves 21-24. Specifically, under control of controller 10, hydraulic actuators 51 and 52 each actuate different portions of slide-gate valve 21, thus controlling the dry granular product introduction from the two hoppers that slide-gate valve 21 regulates; hydraulic actuators 53 and 54 each actuate different portions of slide-gate valve 22, thus controlling the dry granular product introduction from the two hoppers that slide-gate valve 22 regulates; hydraulic actuators 55 and 56 each actuate different portions of slide-gate valve 23, thus controlling the dry granular product introduction from the two hoppers that slide-gate valve 23 regulates; and hydraulic actuator 57 actuates a portion slide-gate valve 24, thus controlling either a dry granular or liquid product introduction from the one hopper that slide-gate valve 24 regulates.

The four slide-gate valves depicted in FIG. 1 are representative of only this preferred embodiment; as those of skill in the art will recognize, any number of valves could be used. For example, the seven hoppers could be regulated by seven slide-gate valves. Or a suitable slide-gate valve could regulate more than two hoppers. In short, according to the present invention, any number of hoppers could be regulated by any number of valves, but one or two hoppers per valve are preferable. In addition, many other valve designs aside from a slide-gate design will be apparent to those of skill in the art.

As is described further below, the hoppers are filled with dry granular ingredients to be mixed in mixing chamber 30, preferably to form a fertilizer Select/Slurry Solution.

Mixing chamber pump 28 provides material from the mixing chamber to a spray hose. Preferably, the spray hose includes a spray nozzle. Water pump 33 provides water from a water reservoir (not shown) to mixing chamber 30. Flow meter 31 monitors the amount of water so provided. Transfer pump 34 may be used to transfer water from an auxiliary a water source (such as a lake or fire hydrant) to fill the water reservoir. Float switch 29 helps prevent overflow in mixing chamber 30 by providing a signal to controller 10 to stop the water flow from water pump 33 when the material in mixing chamber 30 reaches a certain level. Insecticide pump 36 pumps insecticide from an insecticide reservoir to an injection system (such as the model 40 GPM sold by Dosatron Int'l Inc.), which combines the insecticide with water from the water reservoir and sends it to a spray hose. One suitable spray nozzle, for example, is the WhiriJet model AX series-stainless Steel or BX series-solid Brass spray nozzle. Sprayer pump 38 pumps slurry material from mixing chamber 30 to the spray hose. As those of skill in the art will recognize, in other embodiments of this invention one or more of those components, such as the pumps or the injection system, may be eliminated, or additional pumps, injection systems, computer controlled devices or other components may be used.

Clump busters 41-44 are preferably provided to help prevent granular particles from clumping or bridging. In the FIG. 1 embodiment, clump buster 41 interacts with one pair of hoppers; clump buster 42 interacts with a second pair of hoppers; clump buster 43 interacts with a third pair of hoppers; and clump buster 44 interacts with a seventh hopper. As skilled artisans will recognize, one clump buster could interact with any number of hoppers, but one or two hoppers is preferable.

The clump-busters required will be designed and made to order in proportion to each hopper's designated product capacity. A standard size hydraulic actuator will be selected to control each clump-buster.

Figure 2:
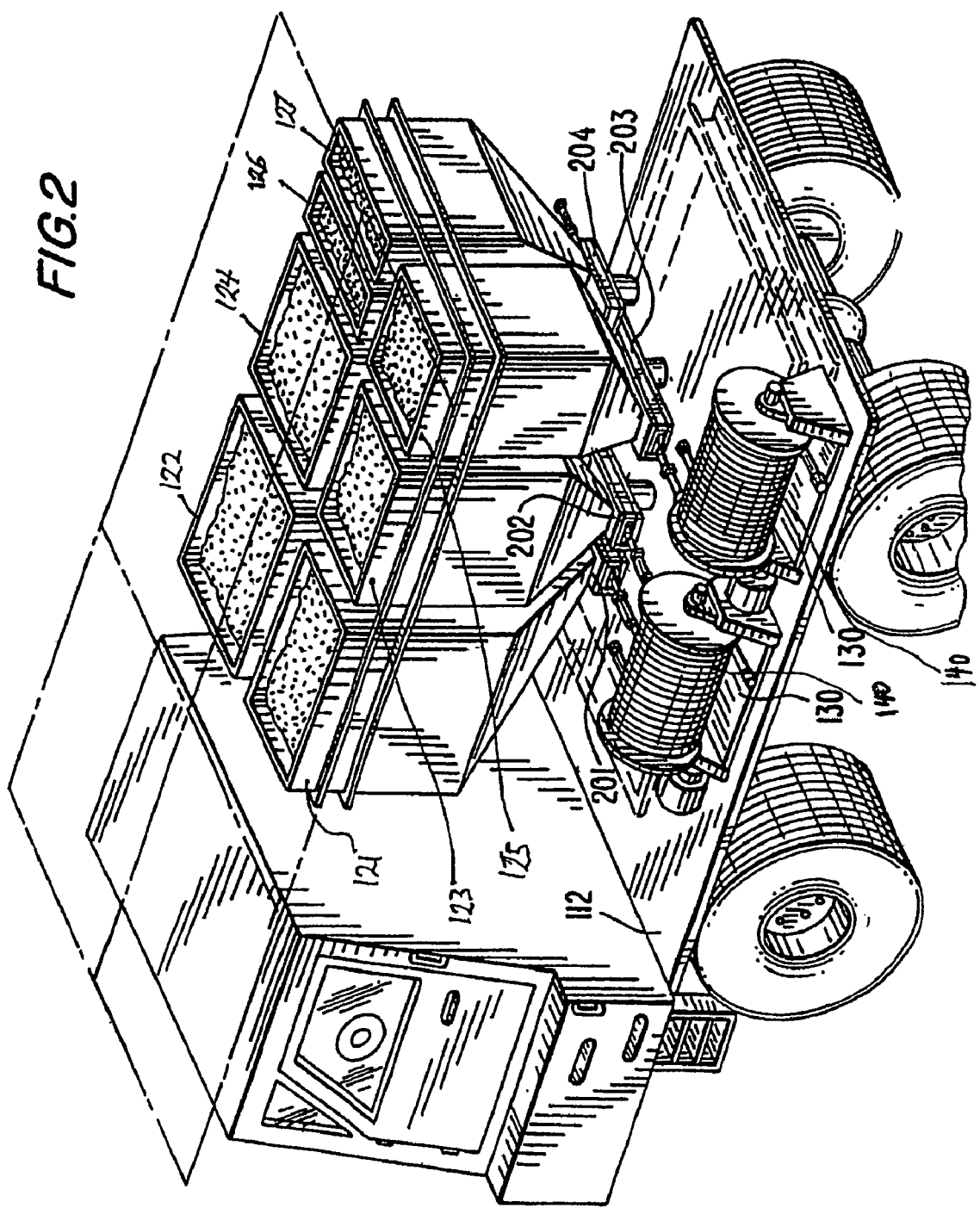
FIG. 2 depicts components of a system for dispensing flowable materials according to the present invention mounted within a truck.

As shown in FIG. 2, components of a system according to the present invention, such as the embodiment of FIG. 1, can be mounted on a truck chassis of any size. Framing 110 is attached to truck chassis support beams. Support beams 131-134 are suspended across beams of framing 110. Double slide-gate valve assemblies 201, 202, and 203 (which correspond to slide-gate valves 21, 22, and 23 in FIG. 1) are installed, respectively, in support beams 131, 132, and 133. Single slide-gate valve assembly 204 (which corresponds to slide-gate valve 24 in FIG. 1) is installed in support beam 134. Hoppers 121-127 are attached to framing 110 and each engages with an associated slide-gate valve assembly. In the FIG. 2 embodiment, slide-gate valve assembly 201 regulates hoppers 121 and 122; slide-gate valve assembly 202 regulates hoppers 123 and 124; slide-gate valve assembly 203 regulates hoppers 125 and 126; and slide-gate valve assembly 204 regulates hopper 127. Also mounted on truck bed 112 are spindles 130, which each may hold a length of spray hose 140.

Figure 3:
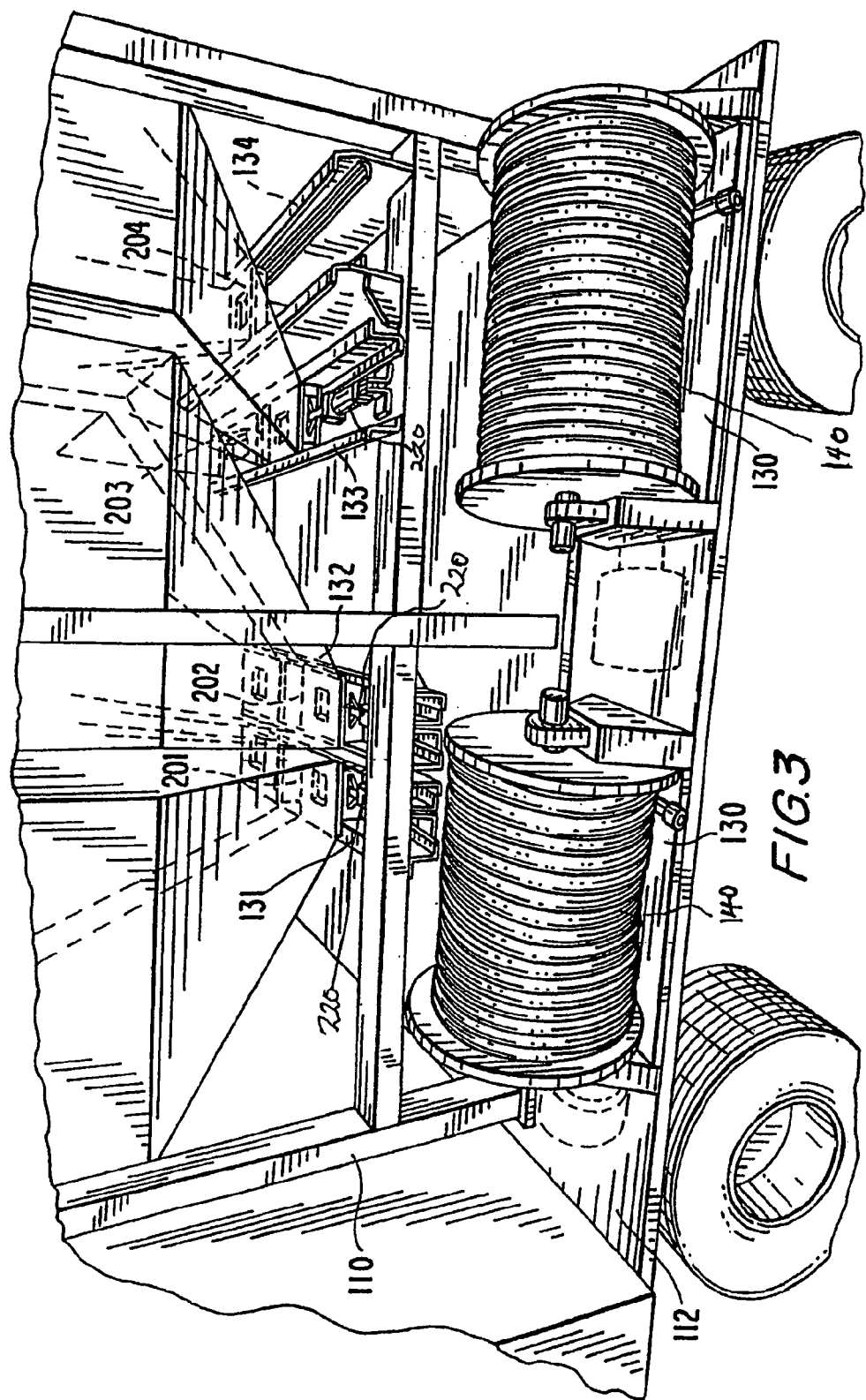
FIG. 3 depicts some of the components shown in FIG. 2.
Figure 4:
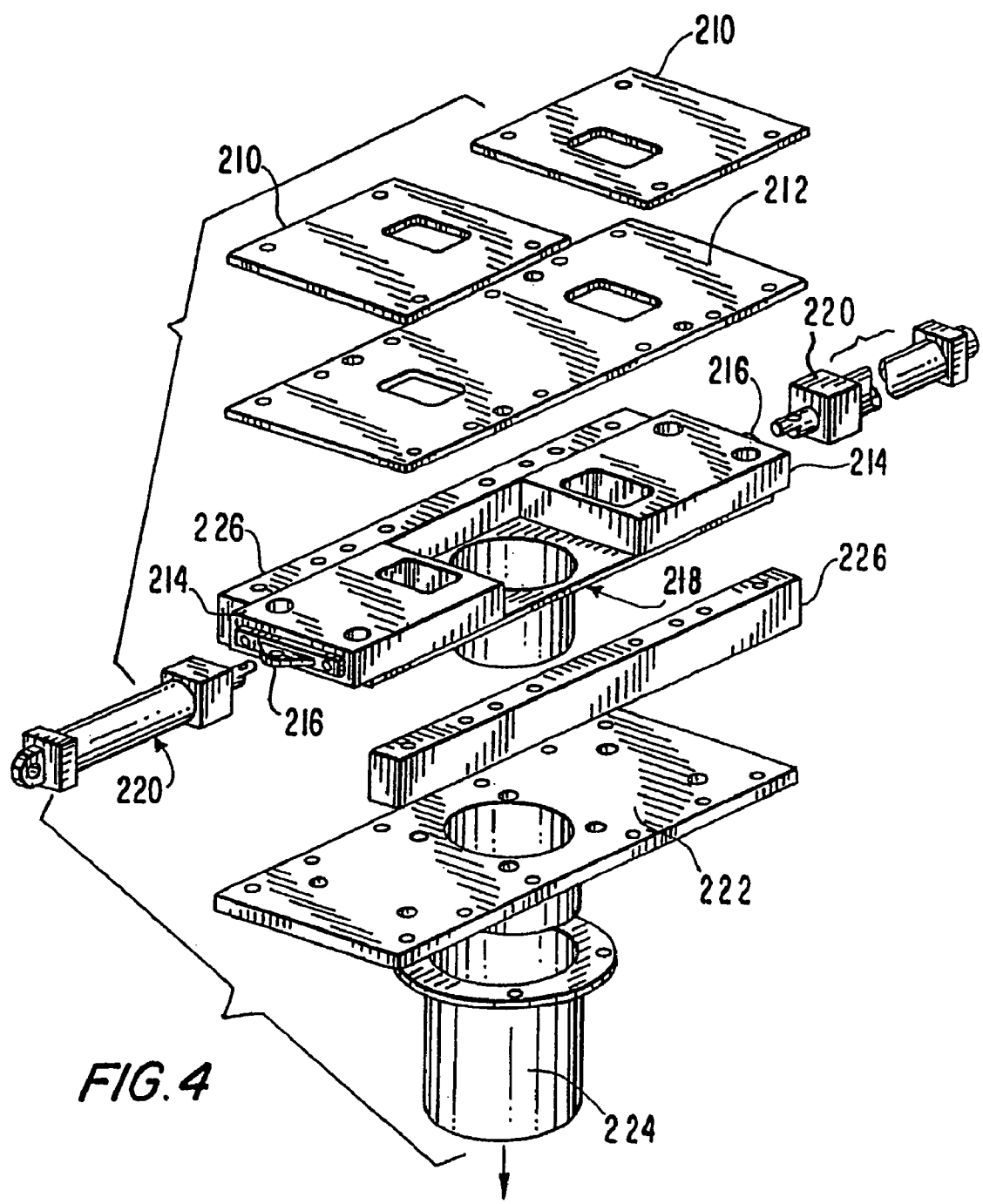
FIG. 4 depicts a double slide-gate valve assembly for use in a system for dispensing flowable materials according to the present invention.

FIG. 3 presents another view of some of the components depicted in FIG. 2. In this embodiment, one hydraulic cylinder 220 is provided for actuating the portion of double slide-gate valve assembly 201 that regulates hopper 121, and a second hydraulic cylinder 220 (not shown) is provided for actuating the portion of double slide-gate valve assembly 201 that regulates hopper 122; a third hydraulic cylinder 220 is provided for actuating the portion of double slide-gate valve assembly 202 that regulates hopper 123, and a fourth hydraulic cylinder 220 (not shown) is provided for actuating the portion of double slide-gate valve assembly 202 that regulates hopper 124; a fifth hydraulic cylinder 220 is provided for actuating the portion of double slide-gate valve assembly 203 that regulates hopper 125, and a sixth hydraulic cylinder 220 (not shown) is provided for actuating the portion of double slide-gate valve assembly 203 that regulates hopper 126; and a seventh hydraulic cylinder 220 (not shown) is provided for actuating the portion of double slide-gate valve assembly 203 that regulates hopper 127. The seven hydraulic cylinders 220 correspond to hydraulic actuators 51-57 in FIG. 1.

Regardless of the design size of the Select/Slurry Solution invention, whether it is mounted onto either an electric gold cart type or gas powered mini utility vehicle, having a 100 gallon capacity and being capable of treating 20,000 sq. ft. of turf grass, or 80,000+ each 6" dia. 6"-8" deep shrub, flower or vegetable plants grown in greenhouses, or in hotel and office building atrium areas, or is mounted on a truck chassis having a 2,000 gallon capacity, capable of 600,000+ sq. ft. coverage (13.86 acres) used for golf course fairways, recreational parks, or large expansive lawn areas, this same precision of custom mixing and applying the required recipe for each plant species on each site can also be achieved.

While the embodiment in FIGS. 2 and 3 features an arrangement whereby the spray hoses 140 are accessible from the driver side of the truck, in other embodiments one or more spray hoses may be available from the passenger side, the rear, the front, the top, the bottom, or any other portion of the truck.

One preferable selection of ingredients to formulate a fertilizer is as follows: hopper 121 would hold 46-0-0 nitrogen in a soluble, quick-release form; hopper 122 would hold 38-0-0 nitrogen in a slow-release form; hopper 123 would hold 0-46-0 phosphorous; hopper 124 would hold 0-0-61 potash; hopper 125 would hold iron sulfate; hopper 126 would hold magnesium and manganese; and hopper 127 would hold liquid chelated iron.

Another selection of ingredients to formulate a fertilizer is as follows: hopper 121 would hold 700 pounds of 46-0-0 Urea in a soluble, quick release form (one suitable product is Lesco—Urea Prill, sprayable); hopper 122 would hold 600 pounds of 31-0-0 nitrogen in a slow-release form (one suitable product is IBDU insoluble slow-release nitrogen); hopper 123 would hold 600 pounds of 38-0-0 nitrogen in a slow-release form (one suitable product is Nitroform Blue Chip urea formaldehyde insoluble slow-release nitrogen); hopper 124 would hold 500 pounds of 0-46-0 Diammonium Phosphate (one suitable product is Lesco—Triple Super Phosphate); hopper 125 would hold 350 pounds of 0-0-54 or 0-0-46.6 Potassium Sulfate or Potassium Nitrate (one suitable product is Lesco Potash); hopper 126 would hold 250 pounds of Iron Ferrous Sulfate (one suitable product is IRON PLUS ELITE 20% FE, 8% MN, 5% MG 7.5% S, 2% ZN labeled and distributed by Lesco, Inc.); hopper 127 would hold approximately 10+ gallons of flowable micronutrients of Calcium, Magnesium, Sulfur, Zinc, CHELATED Iron, Manganese, Copper, Boron, Molybdenum and Chlorine (one suitable pre-blended product is IRON+CHELATED 12% N, 6% FE, 2% MN, labeled and distributed by Lesco, Inc.).

At the beginning of the day, the operator/applicator downloads the appropriate file information for all customers on that day's route from the company's database to an on-board DCS (Digital Control System), which includes the functionality of controller 10. The DCS will provide the applicator with technical history information pertaining to each account.

Formulating a precise recipe of a nutrient mixture for a particular property is achieved first by visually inspecting the condition and health of all plants and, if necessary, testing the pH of the soil to determine its levels of alkalinity or acidity. Next, the size of the lawn is calculated, including adding up the number of all shrubs, trees, and flower planting beds. Based on the above, a quantity of nutrient mixture for that property may be established. Preferably, a scheduled six application annual fertilization and pest control program is used.

At each property, whether residential or commercial, the operator/applicator will begin by engaging the PTO (power take-off) to start the hydraulic and water pumps that will begin formulating and mixing the recipe to be applied. The on-board DCS will have calculated the approximate number of gallons required for treating the total square footage of either lawn or shrub beds of the property by sending a signal to the appropriate slide-gate valves for the precise amount by mass of each nutrient selected to be mixed into the mixing chamber. The water pump will supply slightly more than the adequate amount of water needed to treat the areas, so that the applicator will have a sufficient amount of mixed Select/Slurry Solution to complete the application.

In a preferred embodiment, on average it takes approximately 5 gallons of nutrient mixture to treat 1,000 sq. ft. of turf grass spraying at approximately 45 lbs of pressure. Applying a nutrient mixture to shrub and tree beds requires 1 to 1½ gallons more per 1,000 sq. ft. at 55 lbs of pressure. The slide-gate valves for each nutrient selected will be operating at varying speeds to precisely mix the granular dry nutrients along with water in the mixing chamber to achieve the nutrient mixture required.

Example: Property "A" has approximately 7,000 sq. ft. of lawn area to be treated with a recipe that calls for applying ½ pound of nitrogen (N) per 1,000 sq. ft., including phosphorous (P) and potash (K), mixed together in the respective weight percentages to the total amount of N desired. The original assessment determined that the ½ pound of nitrogen to be applied for this first application is to be made up of ¼ pound 46-0-0 (water-soluble urea) stored in hopper 121 and ¼ pound 31-0-0 (water-insoluble Isobutyidene Diurea IBDU) stored in hopper 122, or any other water insoluble nitrogen source available that releases slowly and evenly.

As the on-board DCS sends command signals, hopper 121 and hopper 122 with their respective slide-gate valves will begin to operate at speeds that continuously supply the precise ¼ pound amount required from each hopper into the water filled mixing chamber.

Substantially simultaneously, the Select/Slurry Solution is discharged through the hose, applying the precise nutrient mixture recipe of the combination of the two to achieve the ½ pound of actual nitrogen (N) selected per 1,000 sq. ft. directly to the designated plants.

Additionally, at substantially the same time, hopper 123 and hopper 124 are also operating at speeds to supply substantially continuously and simultaneously the P and K nutrients and their respective weights in proper proportion to the nitrogen (N) required for the nutrient mixture recipe chosen. If a recipe is required to use three different nitrogen (N) sources—for example, phosphorous (P), potash (K), and iron sulfate (Fe)—and other micro-nutrients, all seven hoppers and their respective slide-gate valves would be operating continuously and simultaneously to supply the maximum number of nutrients to the water filled mixing chamber by their respective weights to achieve the custom blended Select/Slurry Solution recipe.

When the recipe calls for an increase of the nitrogen (N) source in ¼ pound increments per 1,000 sq. ft., the slide-gate valves will increase in speed, picking up the additional poundage or mass of nitrogen, including other nutrients required to achieve the Select/Slurry Solution recipe determined for that property.

After the application is completed, whether to the turf grass area or to the shrub and tree beds, or to both, a history is recorded of the exact application for each nutrient and its quantity used per site, and then downloaded into the database for future application considerations. If and when required on a problem lawn that may be infested with weeds, insects, or fungus disease, a separate on-board non-electric injection system of custom selecting a herbicide, insecticide, or fungicide may be employed by using a separate hose reel. Water is drawn for this on-site custom mixture from the unit's water storage tank, accurately injecting the precise amount of each pesticide required to treat the weed, insect, or disease present on the lawn, or on the shrubs and trees.

A double slide-gate valve assembly for use with the present invention is depicted in FIGS. 4-7. A double slide-gate valve assembly—such as double slide-gate valve assemblies 201, 202, and 203—can regulate the release of material from two hoppers. Hopper plates 210 are fixed to the bottom of each of two hoppers, such as hoppers 121 and 122. The double slide-gate valve assembly is attached to hopper plates 210 via top plate 212. Underneath top plate 212 are valve bodies 214, each of which includes at one end a hydraulic cylinder mating 216. Hydraulic cylinders 220 attach to hydraulic cylinder matings 216 to enable valve bodies 214 to slide back and forth, thus releasing material from their associated hoppers. Underneath valve bodies 214 is pressure plate 218, under which is pressure plate 218. Attached to the bottom of bottom plate 222 is—material chute 224, which directs material from the associated hoppers to a mixing chamber. Side plates 226 are provided to contain other portions of the double slide-gate valve assembly.

A single slide-gate valve assembly for use with the present invention, such as single slide-gate valve assembly 204, can regulate the release of material from one hopper. In view of a double slide-gate valve assembly according to the present invention, such as that depicted in FIGS. 4-7, skilled artisans will be able to realize a single slide-gate valve assembly according to the invention. Other valve assemblies that may regulate one, two, or more hoppers will also be apparent to those of skill in the art.

Moreover, many other valve designs, aside from a slide-gate design, that would be capable of regulating the release of material from one or more hoppers may be utilized.

What is claimed is:

1. An apparatus for mixing and dispensing flowable materials, comprising:
    a mixing chamber;
    a first hopper that retains a first flowable material, connected to said mixing chamber;
    a first valve associated with said first hopper, wherein said first valve regulates the flow of the first flowable material from said first hopper to said mixing chamber;
    a water pump unit;
    a control that selectively controls said first valve and selectively controls said water pump unit;
    a second hopper that retains a second flowable material, connected to said mixing chamber, wherein said first valve is associated with said second hopper and regulates the flow of the second flowable material from said second hopper to said mixing chamber, and wherein said control selectively controls said second valve;
    a third hopper that retains a third flowable material, connected to said mixing chamber;
    a fourth hopper that retains a fourth flowable material, connected to said mixing chamber;
    a second valve associate with said third hopper and fourth hopper, wherein said second valve regulates the flow of the third flowable material from said third hopper to said mixing chamber and the flow of said fourth flowable material from said fourth hopper to said mixing chamber; wherein said control selectively controls said second valve;
    a fifth hopper that retains a fifth flowable material connected to said mixing chamber;
    a sixth hopper that retains a sixth flowable material connected to said mixing chamber;
    a third valve associated with said fifth hopper and sixth hopper, wherein said third valve regulates the flow of said fifth flowable material from said fifth hopper to said mixing chamber and the flow of said sixth flowable material from said sixth hopper to said mixing chamber; wherein said control selectively controls said third valve;
    a seventh hopper that retains a seventh flowable material connected to said mixing chamber;
    a fourth valve connected to said seventh hopper, wherein said fourth valve regulates the flow of said seventh flowable material from said seventh hopper to said mixing chamber, wherein said control selectively controls said fourth valve;
    a hydraulic manifold;
    a hydraulic input; and
    a reservoir return, wherein said hydraulic manifold is connected to a hydraulic input and a reservoir return and to said mixing chamber.

2. The apparatus according to claim 1, wherein the mixing chamber has a capacity of approximately five gallons to approximately eight gallons.

3. The apparatus according to claim 1, wherein the first flowable material has a Tyler mesh screen size of approximately 6 to approximately 100 and the second flowable material has a Tyler mesh screen size of approximately 6 to approximately 100.

4. The apparatus according to claim 1, wherein said control further comprises:
    a data storage device;
    keyboard; and
    display.

5. The apparatus according to claim 1, wherein said water pump unit further comprises:
    a water pump, wherein said water pump is in flowable material communication with said mixing chamber; and
    a water flow meter.

6. The apparatus according to claim 1, further comprising:
   at least one clump buster connected to said hydraulic manifold;
   a transfer pump connected to said hydraulic manifold;
   an insecticide pump connected to said hydraulic manifold; and
   a sprayer pump connected to said hydraulic manifold and in fluid communication with said mixing chamber and a spray hose.

7. The apparatus according to claim 1, wherein said first, second, third and fourth valves are each slide gate valves.

8. The apparatus according to claim 1, further comprising at least one actuator connected to said controller, wherein said at least one actuator actuates said first, second, third and fourth valves.

9. The apparatus according to claim 8, wherein said at least one actuator is four actuators comprising:
   a first actuator connected to said controller that actuates said first valve;
   a second actuator connected to said controller that actuates said second valve;
   a third actuator connected to said controller that actuates said third valve; and
   a fourth actuator connected to said controller that actuates said fourth valve.

10. A method for formulating a nutrient mixture for a designated property of parcel of land, comprising:
   inputting identifying and/or quantitative information for the property into a controller;
   providing a first flowable material in a first hopper, wherein the first hopper is connected to a mixing chamber;
   controlling the flow of the first flowable material from the first hopper to the mixing chamber via the controller, wherein the controller regulates the flow of first flowable material in accordance with the identifying and/or quantitative information;
   pumping an amount water in accordance with the identifying and/or quantitative information into the mixing chamber;
   providing second flowable material in a second hopper, wherein the second hopper is connected to the mixing chamber;
   controlling the flow of the second flowable material from the second hopper to the mixing chamber via the controller, wherein the controller regulates the flow of the flowable material in accordance with the identifying and/or quantitative information,
   wherein at least one valve is in communication with the controller, wherein the at least one valve is associated with the first hopper and associated with the second hopper and wherein the at least one valve regulates the flow of the first flowable material and the flow of the second flowable material in accordance with the identifying and/or quantitative information;
   actuating at least one hydraulic actuator associated with the at least one valve, wherein the at least one actuator is hydraulically connected to a manifold;
   providing a hydraulic input hydraulically connected to the manifold;
   providing a reservoir return hydraulically connected to the manifold;
   providing a sprayer pump hydraulically connected to the manifold and fluidically connected to the mixing chamber and a spray hose;
   providing a water pump hydraulically connected to the manifold and fluidically connected to the mixing chamber; and
   electrically controlling the at least one hydraulic actuator to selectively operate the at least one valve.

11. The method according to claim 10, further comprising mixing the first flowable material and the second flowable material and water in the mixing chamber.

12. The method according to 10, wherein the mixing chamber has a capacity of approximately five gallons to approximately eight gallons.

13. The method according to claim 10, wherein the first flowable material has a Tyler mesh screen size of approximately 6 to approximately 100 and the second flowable material has a Tyler mesh screen size of approximately 6 to approximately 100.

14. An apparatus for automatically dispensing flowable materials under control of a computer, comprising:
   a mixing chamber;
   a hydraulic assembly comprising a hydraulic manifold and an actuator hydraulically connected to the manifold;
   a hopper assembly comprising: at least two hoppers connected to said mixing chamber, wherein each hopper retains a flowable material; and
   at least one valve associated with said at least two hoppers, wherein at least one said valve regulates the flow of flowable material from said hoppers to said mixing chamber; and a pump assembly connected to said hydraulic assembly, said pump assembly comprising a water pump connected to said hydraulic manifold; and a controller electrically connected to said actuator for selectively controlling said actuator and being electrically connected to said at least one valve for controlling the operation of at least one the valve under control of said computer.

15. An apparatus for mixing and dispensing flowable materials, comprising:
   at least two hoppers mechanically connected to a mixing chamber;
   at least one valve associated with said at least two hoppers, wherein said at least on valve regulates the flow of material from each of said at least two hoppers to the mixing chamber;
   a controller electrically connected to said at least one valve that selectively controls the operation of said at least one valve;
   at least one hydraulic actuator, hydraulically connected to a manifold, wherein said at least on hydraulic actuator is associated with at least one valve;
   a hydraulic input hydraulically connected to said manifold;
   a reservoir return hydraulically connected to said manifold;
   a sprayer pump hydraulically connected to the manifold and fluidically connected to said mixing chamber and a spray hose; and
   a water pump hydraulically connected to said manifold and fluidically connected to said mixing chamber, wherein said controller is electrically connected to said at least one hydraulic actuator and wherein said controller selectively controls said at least one actuator.

16. A method for dispensing flowable materials, comprising:
   providing granular material in a plurality of hoppers, wherein each hopper is mechanically connected to a mixing chamber;
   regulating the flow of material from each of the hoppers to the mixing chamber with at least one valve associated with the hoppers;
   electrically controlling the at least one valve to selectively operate the at least one valve
   actuating at least one hydraulic actuator associated with at least one valve, wherein the at least one actuator is hydraulically connected to a manifold;

providing a hydraulic input hydraulically connected to the manifold;
providing a reservoir return hydraulically connected to the manifold;
providing a sprayer pump hydraulically connected to the manifold and fluidically connected to the mixing chamber and a spray hose;
providing a water pump hydraulically connected to the manifold and fluidically connected to the mixing chamber; and
electrically controlling the at least one hydraulic actuator to selectively operate the at least one valve.

\* \* \* \* \*